United States Patent
Steensma

[11] 3,985,975
[45] Oct. 12, 1976

[54] HOLOGRAPHIC TELEPHONE SWITCHING SYSTEM

[75] Inventor: Peter D. Steensma, Midland Park, N.J.

[73] Assignee: International Telephone and Telegraph Corporation, Nutley, N.J.

[22] Filed: Oct. 20, 1975

[21] Appl. No.: 623,689

Related U.S. Application Data

[63] Continuation-in-part of Ser. No. 555,227, March 4, 1975, abandoned.

[52] U.S. Cl.............................. 179/18 GF; 350/3.5
[51] Int. Cl.² ...................... H04M 3/00; H04Q 1/52; G02B 5/32
[58] Field of Search ........ 179/18 GF, 18 GE, 15 W, 179/1.5 E; 350/3.5; 340/146.3 P, 174 YC, 174 MA, 173 LT, 173 LS, 173 LM; 250/199

[56] References Cited
UNITED STATES PATENTS

| | | | |
|---|---|---|---|
| 3,531,181 | 9/1970 | Scarrott | 350/150 |
| 3,622,710 | 11/1971 | Tothill | 179/18 GF |
| 3,651,498 | 3/1972 | Magill et al. | 340/146.3 P |
| 3,750,114 | 7/1973 | Valassis | 179/18 GF |

*Primary Examiner*—Thomas A. Robinson
*Attorney, Agent, or Firm*—John T. O'Halloran; Alfred C. Hill

[57] ABSTRACT

A matrix of electrical to light converting diodes are each coupled to different ones of a plurality of incoming telephone lines. These diodes emit light at all times and have their light intensity modulated by intelligence when intelligence is present on their associated one of the incoming telephone lines. A corresponding matrix of optical to electrical converting diodes are each coupled to a different one of a plurality of outgoing telephone lines. A holograpic plate having a corresponding matrix of stored holograms is positioned between the input and output diode matrixes. Each of the stored holograms is uniquely related to a different one of the outgoing telephone lines. An optical coupling device responsive to incoming telephone dial signals is disposed between the first mentioned diode matrix and the hologram. In response to the dial signal, the optical coupling device spatially phase modulates the optical signals from the first mentioned diode matrix transverse to the direction of propagation of these optical signals. The resultant light beams at the output of the optical coupling device has a unique pattern of spatial phase modulation for each of the possible dial signals which correspond to different ones of the output lines. When the resultant light beams from the coupling device illuminate the holographic plate, the spatial phase modulated pattern of optical beams selct and reconstruct a uniquely related one of the holograms on the holographic plate to enable transmission of intelligence carried by the optical beams through the reconstructed one of the holograms so as to be directed to the appropriate one of the light to electrical converting diodes to provide the connection to the associated one of the outgoing telephone lines thereby establishing a connection in the switching system from the active one of the incoming telephone lines to the selected one of the outgoing telephone lines.

15 Claims, 3 Drawing Figures

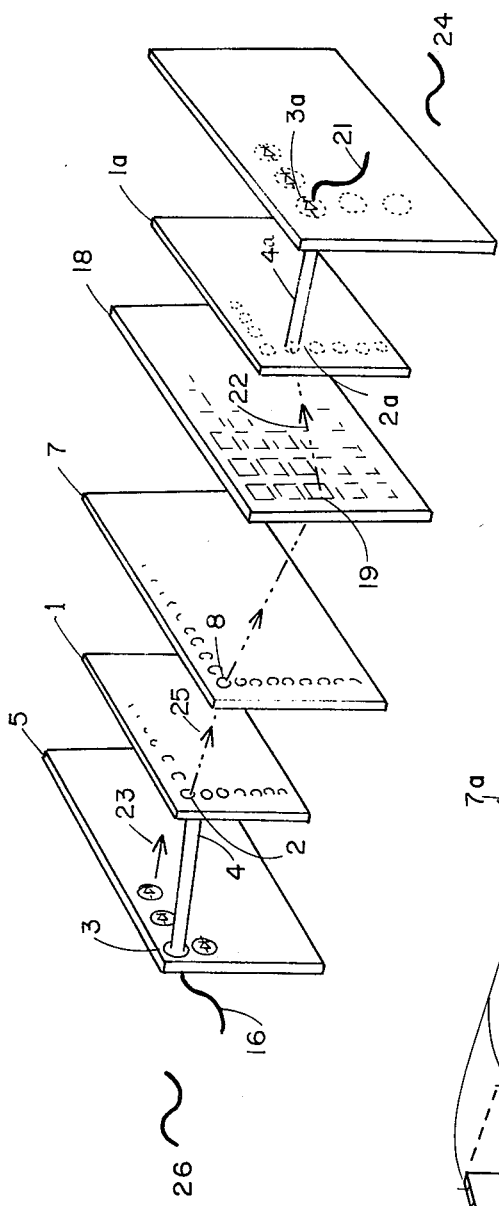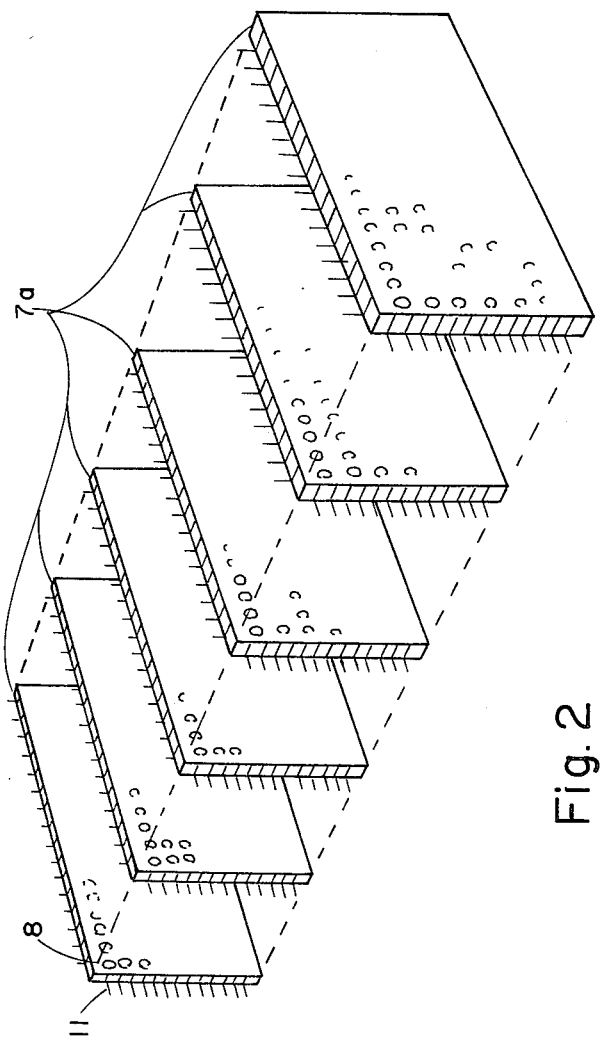

HOLOGRAPHIC TELEPHONE SWITCHING SYSTEM

CROSS-REFERENCE TO RELATED APPLICATIONS

This is a continuation-in-part application of copending application Ser. No. 555,227, filed Mar. 4, 1975, now abandoned.

BACKGROUND OF THE INVENTION

The invention relates to telephone systems and more particularly to telephone switching systems.

Telephone switching, as generally known, has required in the past a large number of electromechanical components within a specific crosspoint matrix arrangement for connecting between a calling party and a called party upon existing telephone lines. The calling party's dial signal instructs the switching mechanism to connect between one pair out of a very large number of interconnecting telephone lines by a carefully controlled system dependent on the impulses generated by the interruption of an electric current with the dial-type telephone subset, or by the generation of dial tones with the voice frequency touch-tone telephone subset.

Recent innovations involving the use of computer storage registers to effect rapid connection between incoming and outgoing telephone lines on the main distribution frame have eliminated a great deal of the electromechanical components that have proved to be expensive to maintain and difficult to rapair. However, with the continued increase in telephone communication, larger number of lines must continuously be made available and more rapid means developed in order to efficiently switch between the calling party and the called party on the increasing number of lines. In addition, the bandwidth of the interconnecting elements is limited and may create difficulties in switching lines carrying high data rates.

SUMMARY OF THE INVENTION

An object of the present invention is to provide an efficient method and arrangement for switching between existing telephone lines comprising a rapid and efficient electro-optical system which replaces and greatly improves on the electro-mechanical switching system of the prior art.

A feature of the present invention is the provision of a holographic switching system for connecting between incoming telephone lines and outgoing telephone lines comprising: first means coupled to the incoming telephone lines to provide a plurality of optical signals each coupled to a different one of the incoming telephone lines and for converting electrical intelligence modulated telephone signals on at least one of the incoming telephone lines into intensity modulation of the associated one of the optical signals; second means coupled to the first means for converting an electical dialing signal on at least one of the incoming telephone lines to a spatial phase modulation of the optical signals transverse to the direction of propagation of the optical signals; a holographic plate coupled to the second means, the holographic plate containing a plurality of holographic images each corresponding to different one of the outgoing telephone lines, the spatial phase modulated optical signals selecting and reconstructing one of the holographic images as determined by the dialing signal to enable transmission of intelligence carried by the optical signals through the reconstructed one of the holographic images; and third means coupled to the holographic plate for receiving the intelligence of the optical signals and converting the received intelligence of the optical signals into a corresponding electrical signal for transmission on the selected one of the outgoing telephone lines as determined by the reconstructed one of the holographic images.

Another feature of the present invention is the provision of a method of connecting at least one of a plurality of incoming telephone lines to a selected one of a plurality of outgoing telephone lines comprising the steps of: generating a plurality of optical beams each associated with a different one of the plurality of incoming telephone lines; modulating the plurality of generated optical beams by an electrical dialing signal identifying the selected one of the outgoing telephone lines on the one of the plurality of incoming telephone lines to provide a spatial phase modulation of the plurality of optical beams transverse to the direction of propagation of the plurality of optical beams, the spatial phase modulation having a different unique spatial phase modulation pattern for the plurality of spatial beams to uniquely define each of the outgoing telephone lines; illuminating a holographic plate having a plurality of holograms thereon with the spatial phase modulation pattern of the plurality of optical beams, each of the plurality of holograms corresponding to a different one of the outgoing telephone lines, one of the holograms being reconstructed by its unique spatial phase modulation pattern of the plurality of optical beams to establish a connection to the selected one of the outgoing telephone lines; and converting the reconstructed hologram to an electrical signal for transmission on the selected one of the outgoing telephone lines.

BRIEF DESCRIPTION OF THE DRAWINGS

Above-mentioned and other features and objects of this invention will become more apparent by reference to the following description taken in conjunction with the accompanying drawing, in which:

FIG. 2 is an exploded view of the electro-optical coupler of FIG. 1; and

FIG. 3 is a schematic representation of FIG. 1 illustrating the light path through the holographic switching system of FIG. 1.

DESCRIPTION OF THE PREFERRED EMBODIMENT

Figure 1:
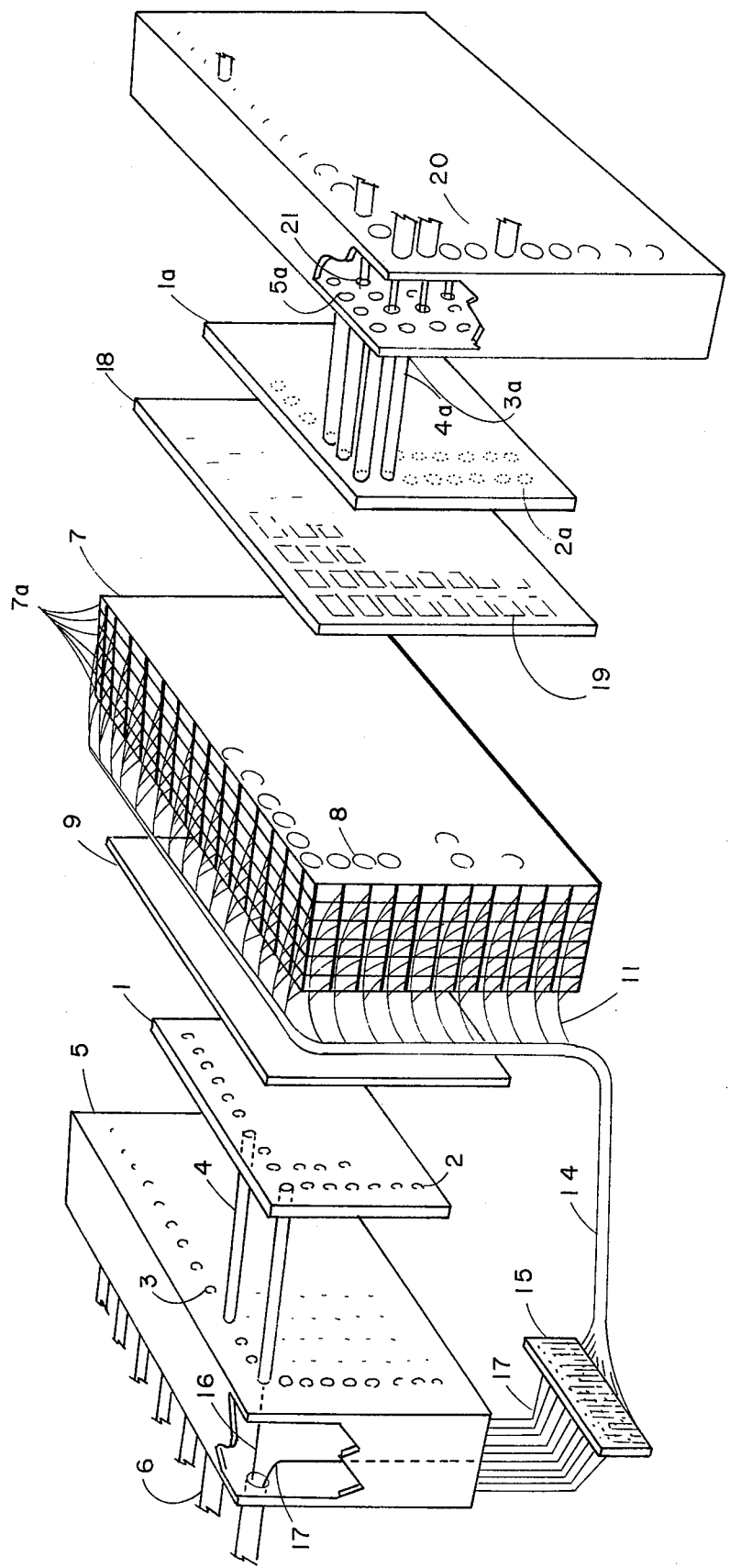
FIG. 1 is a diagrammatic illustration of the holographic switching system in accordance with the principles of the present invention.

Referring to FIG. 1, 6 the holographic telephone switching system of the present invention includes a plurality of incoming telephone lines 6 each being divided into an incoming call line 16 and a dial line 17. A matrix of electrical-to-light converting diodes 3 are each connected with a different one of the call lines 16 and are arranged as a light emitting diode matrix 5. A fiber optic matrix array 1 is positioned immediately forward of matrix 5. Array 1 can be substantially smaller than matrix 5 due to the miniaturization of the corresponding fiber optic faces 2 connected with diodes 3 by means of very small diameter optical fibers 4.

Each of diodes 3 emit a light beam or optical signal at all times to provide a large number of light beams. Intelligence on a line 16 connected to its associated diode 3 will intensity modulate the light beam of this diode 3 with the intelligence on line 16 resulting in a temporal intensity modulation of the affected light beam.

Dial line 17, associated with call line 16 upon which intelligence is to be conveyed, carriers the dialing impulse relating to the particular called party positioned within the telephone system. The dial line 17 is connected by means of a printed circuit board connector 15 to an electro-optical coupling device 7.

The electro-optical coupling device 7 comprises a large number of optical tubes 8 in a matrix array positioned immediately forward of matrix 1 so that each optical fiber face 2 is capable of illuminating all optical tubes 8 within the optical coupler 7. Each of the tubes 8 has an associated tube electrode 11 for controlling the optical transmission properties of the tube depending upon the presence of absence of an electrical signal on electrodes 11. Each tube electrode 11 is connected to at least one of the telephone dial lines 17 by means of electrode leads 14 and the printed circuit board connector 15. The electro-optical coupler 7 is shown in a simplified version within the holographic switching system of FIG. 1 for purposes of clarity. An enlarged view of the electro-optical coupler 7 can be seen in FIG. 2 where coupler 7 is formed by six subarrays 7a, each of which contain in alignment a matrix of optical tubes 8. The subarrays of electro-optical tubes 8 can be cascaded in an arrangement such that each consecutive subarray 7a is responsive to a particular digital impulse train within the dial impulse signal similar, for example, to the cascade arrangement of an electromechanical crosspoint switching arrangement.

The tubes 8 contain an electro-optically sensitive liquid, such as nitrobenzene, which is either transparent to plane polarized light when the tube is not activated by dial impulses, or the phase of the light beam passing through tube 8 is changed in phase 180° as described in U.S. Pat. No. 3,531,181 issued to Scarrot, whose disclosure is incorporated herein by reference. The tube of the Scarrot device is conveniently chosen for the purpose of the switching system of the present invention since a large number of the miniscule electro-optical tubes can be cascaded together to spatially phase modulate the optical beams passing through these tubes in accordance with the telephone dial signals. The purpose of the electro-optical coupler 7 of FIGS. 1 and 2 is to apply to the plurality of light beams emitted by diodes 3 a particular spatial phase modulation pattern transverse to the direction of the propagation of the light beams with each of the possible patterns of spatial phase modulation uniquely identifying one of the outgoing telephone lines.

Each time light passes through a tube 8 in a subarray 7a that is activated by a dial signal the phase of that light is shifted 180° and each time light passes through a tube 8 in a subarray 7a that is not activated by a dial signal the phase of the light beam is not changed. Thus, in the six subarrays 7a of coupler 7 where only one the tubes 8 is activated, the light passing through that tube will be rotated 180° and will emerge from the last subarray 7a with a 180° phase rotation. If tube 8 of one or more of the other subarrays 7a associated with this particular light are actuated by the dial signal, the light entering that actuated tube will appear at the output with one or more additional 180° phase rotations. Thus, if tubes 8 associated with a particular position in two subarrays are actuated by the dial signal, then the resultant phase of that associated light beam at the output of the last subarray 7a is a 0° phase shift. If tubes 8 of all six arrays associated with a particular position in the subarrays are actuated, this light beam will actually have six 180° phase shifts which will result in the light beam at the output of the last subarray having no phase shift. As a result each of the light beams emerging from the last subarray 7a of coupler 7 is shifted in phase 180° or not shifted in phase (has 0° phase shift) resulting in a spatial phase modulation pattern of the emerging wavefront of the light beams transverse to the direction of propagation of the light beams that is unique for each different dial signal. The light beams are each diffused so that each light beam completely illuminates holographic plate 18. When a particular spatial phase modulation pattern of the light beams illuminates holographic plate 18 a hologram 19 uniquely related to this particular spatial phase modulation pattern of light beams is reconstructed and coupled to a uniquely related one of the light-to-electrical converting diodes 3a formed in a matrix 5a identical to matrix 5. The activated one of diodes 3a is coupled to an associated one of the outgoing telephone lines 21 and, thus, is uniquely related to the particular spatial phase modulation pattern of the light beams involved. The output fiber optic matrix array 1a is positioned relative to holographic plate 18 so that the hologram 19 uniquely related to the spatial phase modulation pattern of the light beams involved is reconstructed to correspond to a particular optical fiber face 2a within the matrix 1a.

This is accomplished, for example, by the use of a photographic plate where a series of images are recorded within the holographic plate by the use of a reference beam as described in U.S. Pat. No. 3,612,641, issued to Eaglesfield, whose disclosure is incorporated herein by reference. As taught in this patent, each of the stored images in the holographic plate are diffused across the holographic plate and each particular image stored within the holographic plate is uniquely reconstructed corresponding to a particular reference beam so that the reference beam striking a particular image causes all other images within the holographic plate to cancel so that only one particular image will become reconstructed in response to the illumination of the holographic plate by the pattern of the spatial phase modulated light beams at the output of coupler 7. The method of Eaglesfield, therefore, provides one means for storing a large number of images each related to a number of predirected incoming beams.

The holographic switching system of the instant invention provides a one-to-one correspondene between the individual optical fiber faces 2a of the output array 1a and connects each of the optical fiber faces 2a with a corresponding light receptor or light-to-electrical converter diode 3a by means of a series of interconnecting optical fibers 4a. The electrical signals generated by diodes 3a within the light receptor matrix 5a are electrically connected to a corresponding number of outgoing telephone lines 20 by means of the interconnected outgoing telephone lines 21.

Linear polarizer 9 is disposed between matrix 1 and coupler 7a to provide a reference phase (polarization) for the light beams coupled to the input of coupler 7.

The six subarrays 7a of coupler 7 are employed to provide a sufficient number of spatial phase modulated patterns of the light beams to enable connecting one of a large number of incoming telephone lines to a selected one of a large number of outgoing telephone lines.

FIG. 3 shows the input array 1, the electro-optical coupler 7, the holographic plate 18 and the output fiber optical array 1a. Here an incoming telephone signal 26 intensity modulates the light beam emitted by an associated one of diodes 3. Diodes 3 provide a plurality of light beams at least one of which is intensity modulated with the light beams being emitted from array 1 being illustrated by arrow 25. Arrow 23 illustrates the direction of travel of the light beams from diodes 3. The electro-optical coupler 7 by means of the aforementioned optical tubes 8 in response to input dialing signals applies a predetermined pattern of spatial phase modulation across the light beams 25 each of which are diffused prior to illuminating holographic plate 18 so that each light beam completely illuminates holographic plate 18. The beams 25 illuminating holograhic plate 18 then uniquely selects one of the holograms 19 determined by the dial signal so that the intelligence modulated light beams can pass through this reconstructed hologram 19 to the optical fiber face 2a. The light beam is then launched along the optical fiber 4a to a corresponding light receptor or light-to-electrical converter diode 3a. Diode 3a converts the optical intelligence to electrical intelligence so that signal 24 appears on the output line 21.

Information is transferred between the incoming call line 16 to the outgoing telephone line 21 by means of the optical path created therebetween within the optics of the holographic switching system. One method of transferring the information is to intensity modulate the light beam of diode 3 associated with the active incoming telephone line 16 which intensity modulation is detected by diode 3a at the appropriate selected outgoing telephone line due to the diffusion of the light beams at holographic plate 18.

Diode 3 and 3a are also capable of the reverse conversion; that is, diode 3 can convert optical signals to electrical signals and diode 3a can convert electrical signals to optical signals. This is important for the purpose of this disclosure so that both the calling party and the called party may communicated over the same light path.

The holographic switching system of this invention readily relates to a number of applications other than telephone crosspoint switching systems. Telegraphic communication, for example, can occur by means of pulse code modulating a single light emitting diode whereby a large number of calling parties can be separately connected by means of the relationship existing in the one-to-one correspondence between the images within the holographic plate and between patterns of the spatial phase modulated optical beams communicating with the holograms within the holographic plate.

One of the main features of the instant holographic switching system is the miniaturization afforded by the use of a miniscule faceplate represented by the optical fiber array in comparison to the size of incoming and outgoing telephone line terminals. It is anticipated that a substantial savings can be achieved in the overall compactness of the optical system employed since no wires are required, no electromechanical switching devices are employed, and the holographic information storage is known to be one of the highest density forms of memory presently known.

While I have described above the principles of my invention in connection with specific apparatus it is to be clearly understood that this description is made only by way of example and not as a limitation to the scope of my invention as set forth in the objects thereof and in the accompanying claims.

I claim:
1. A holographic switching system for connecting between incoming telephone lines and outgoing telephones lines comprising:
   first means coupled to said incoming telephone lines to provide a plurality of optical signals each coupled to a different one of said incoming telephone lines and for converting electrical intelligence modulated telephone signals on at least one of said incoming telephone lines into intensity modulation of the associated one of said optical signals;
   second means coupled to said first means for converting an electrical dialing signal on said at least one of said incoming telephone lines to a spatial phase modulation of said optical signals transverse to the direction of propagation of said optical signals;
   a holographic plate coupled to said second means, said holographic plate containing a plurality of holographic images each corresponding to a different one of said outgoing telephone lines, said spatial phase modulated optical signals selecting and reconstructing one of said holographic images as determined by said dialing signal to enable transmission of intelligence carried by said optical signals through said reconstructed one of said holographic images; and
   third means coupled to said holographic plate for receiving said intelligence of said optical signals and converting said received intelligence of said optical signals into a corresponding electrical signal for transmission on said selected one of said outgoing telephone lines as determined by said reconstructed one of said holographic images.

2. A system according to claim 1, wherein said first means includes
   a matrix of electrical to light converting diodes coupled to the output of said incoming telephone lines, and
   a first matrix of fiber optics coupled to the output of said matrix of electrical to light converting diodes.

3. A system according to claim 2, wherein said third means includes
   a second matrix of fiber optics coupled to the output of said holographic plate, and
   a matrix of light to electrical converting diodes.

4. A system according to claim 3, wherein said second means includes
   a matrix of electro-optic tubes coupled to the output of said first matrix of fiber optics, each of said tubes containing a liquid electro-optic material and at least one electrical connection attached to each of said tubes for varying the phase of the associated one of said optical signals passing therethrough when said dialing signal is applied to said electrical connection to provide said spatial phase modulated optical signals.

5. A system according to claim 4, wherein said second means further includes
   a linear polarizing plate disposed between the output of said first matrix of fiber optics and the input of said tubes.

6. A system according to claim 5, wherein said holographic plate includes
- a photographic plate containing a matrix of holographic images, each of said images corresponding to a different one of said outgoing telephone lines, said spatial phase modulated optical signals from said second means having a different predetermined pattern of phase shifted opical signals for each of said holographic images illuminating said photographic plate for reconstructing that one of said holographic images corresponding to one of said predetermined pattern as determined by said dialing signal to enable coupling said intelligence of said optical signals to the appropriate one of said light to electrical converting diodes and, hence, to said selected one of said outgoing telephone lines.

7. A system according to claim 1, wherein said third means includes
- a matrix of fiber optics coupled to the output of said holographic plate, and
- a matrix of light to electrical converting diodes.

8. A system according to claim 7, wherein said second means includes
- a matrix of electro-optical tubes coupled to the output of said first means, each of said tubes containing a liquid electro-optic material and at least one electrical connection attached to each of said tubes for varying the phase of the associated one of said optical signals passing therethrough when said dialing signal is applied to said electrical connection to provide and spatial phase modulated optical signals.

9. A system according to claim 8, wherein said second means further includes
- a linear polarizing plate disposed between the output of said first means and the input of said tubes.

10. A system according to claim 9, wherein said holographic plate includes
- a photographic plate containing a matrix of holographic images, each of said images corresponding to a different one of said outgoing telephone lines, said spatial phase modulated optical signals from said second means having a different predetermined pattern of phase shifted optical signals for each of said holographic images illuminating said photographic plate for reconstructing that one of said holographic images corresponding to one of said predetermined pattern as determined by said dialing signal to enable coupling said intelligence of said optical signals to the appropriate one of said light to electrical converting diodes and, hence, to said selected one of said outgoing telephone lines.

11. A system according to claim 1, wherein said second means includes
- a matrix of electro-optic tubes coupled to the output of said first means, each of said tubes containing a liquid electro-optic material and at least one electrical connection attached to each of said tubes for varying the phase of the associated one of said optical signals passing therethrough when said dialing signal is applied to said electrical connection to provide said spatial phase modulated optical signals.

12. A system according to claim 11, wherein said second means further includes
- a linear polarizing plate disposed between the output of said first means and the input of said tubes.

13. A system according to claim 2, wherein said holographic plate includes
- a photographic plate containing a matrix of holographic images, each of said images corresponding to a different one of said outgoing telephone lines, said spatial phase modulated optical signals from said second means having a different predetermined pattern of phase shifted optical signals for each of said holographic images illuminating said photographic plate for reconstructing that one of said holographic images corresponding to one of said predetermined pattern as determined by said dialing signal to enable coupling said intelligence of said optical signals to the appropriate one of said light to electrical converting diodes and, hence, to said selected one of said outgoing telephone lines.

14. A system according to claim 1, wherein said holographic plate includes
- a photographic plate containing a matrix of holographic images, each of said images corresponding to a different one of said outgoing telephone lines, said spatial phase modulatd optical signals from said second means having a different predetermined pattern of phase shifted optical signals for each of said holographic images illuminating said photographic plate for reconstructing that one of said holographic images corresponding to one of said predetermined pattern as determined by said dialing signal to enable coupling said intelligence of said optical signals to the appropriate one of said light to electrical converting diodes and, hence, to said selected one of said outgoing telephone lines.

15. A method of connecting at least one of a plurality of incoming telephone lines to a selected one of a plurality of outgoing telephone lines comprising the steps of:
- generating a plurality of optical beams each associated with a different one of said plurality of incoming telephone lines;
- modulating said plurality of generated optical beams by an electrical dialing signal identifying said selected one of said outgoing telephone lines on said one of said plurality of incoming telephone lines to provide a spatial phase modulation of said plurality of optical beams transverse to the direction of propagation of said plurality of optical beams; said spatial phase modulation having a different unique spatial phase modulation pattern for said plurality of optical beams to uniquely define each of said outgoing telephone lines;
- illuminating a holographic plate having a plurality of holograms thereon with said spatial phase modulation pattern of said plurality of optical beams, each of said plurality of holograms corresponding to a different one of said outgoing telephone lines, one of said holograms being reconstructed by its unique spatial phase modulation pattern of said plurality of optical beams to establish a connection to said selected one of said outgoing telephone lines and
- converting said reconstructed hologram to an electrical signal for transmission on said selected one of said outgoing telephone lines.

* * * * *